(12) United States Patent
Baek et al.

(10) Patent No.: US 8,805,451 B2
(45) Date of Patent: Aug. 12, 2014

(54) PORTABLE TERMINAL WITH QWERTY KEYPAD AND METHOD FOR PROCESSING PHONE NUMBERS IN THE PORTABLE TERMINAL

(75) Inventors: Hyun Jung Baek, Seoul (KR); Ji Yeon Lee, Gum-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 759 days.

(21) Appl. No.: 12/587,707

(22) Filed: Oct. 13, 2009

(65) Prior Publication Data

US 2010/0093404 A1  Apr. 15, 2010

(30) Foreign Application Priority Data

Oct. 13, 2008  (KR) .................. 10-2008-0100185

(51) Int. Cl.
*H04M 1/00* (2006.01)
(52) U.S. Cl.
USPC ...... 455/566; 455/550.1; 455/564; 455/575.1
(58) Field of Classification Search
USPC .............. 455/566, 550.1, 418–420, 564–565; 379/216.01; 345/469
See application file for complete search history.

(56) References Cited

U.S. PATENT DOCUMENTS

| | | | |
|---|---|---|---|
| 5,117,455 A * | 5/1992 | Danish | 379/368 |
| 5,848,356 A * | 12/1998 | Jambhekar et al. | 455/403 |
| 6,167,287 A * | 12/2000 | Chozui | 455/566 |
| 7,277,732 B2 * | 10/2007 | Chen et al. | 455/566 |
| 7,424,306 B2 | 9/2008 | Eichenbaum | 455/550.1 |
| 8,255,001 B2 * | 8/2012 | Hardy et al. | 455/564 |
| 2004/0018852 A1 * | 1/2004 | Burke et al. | 455/550.1 |
| 2007/0082708 A1 * | 4/2007 | Griffin | 455/565 |
| 2008/0317240 A1 * | 12/2008 | Chang et al. | 379/368 |
| 2010/0054446 A1 * | 3/2010 | Braun | 379/216.01 |

* cited by examiner

*Primary Examiner* — Sharad Rampuria

(57) ABSTRACT

A portable terminal including a QWERTY keypad is capable of converting alpha-numeric inputs into a numeric only phone number. The portable terminal includes a controller that processes a phone number of a combination of letters and numbers. The controller can identify whether the input phone number contains letters. When the input phone number contains letters, the controller refers to a table for converting letters to numbers and converts the alpha-numeric phone number into a numeric phone number by converting the identified letters into corresponding numbers.

20 Claims, 6 Drawing Sheets

PORTABLE TERMINAL WITH QWERTY KEYPAD AND METHOD FOR PROCESSING PHONE NUMBERS IN THE PORTABLE TERMINAL

CROSS-REFERENCE TO RELATED APPLICATION(S) AND CLAIM OF PRIORITY

The present application is related to and claims priority to an application entitled "PORTABLE TERMINAL WITH QWERTY KEYPAD AND METHOD FOR PROCESSING PHONE NUMBERS IN THE PORTABLE TERMINAL" filed in the Korean Intellectual Property Office on Oct. 13, 2008 and assigned Serial No. 10-2008-0100185, the contents of which are incorporated herein by reference.

TECHNICAL FIELD OF THE INVENTION

The present invention relates to portable terminals, and more particularly, to a portable terminal with a QWERTY keypad and a method for processing a phone number comprised of a combination of letters and numbers in the portable terminal.

BACKGROUND OF THE INVENTION

In general, portable terminals refer to electronic devices that are personal portable devices and can provide a variety of services as well as wireless communication service, using application programs. Examples of the portable terminals are personal mobile communication services terminals, Personal Digital Assistants (PDAs), smart phones, International Mobile Telecommunication 2000 (IMT-2000) terminals, wireless Local Area Network (LAN) terminals, and the like.

With the rapid development of technology, portable terminals have been providing a variety of functions, such as a video call, an electronic organizer, a voice or video storing function, an Internet function, game device function, and so forth, as well as a voice call and an SMS message transmission. In addition to these functions, recently, they have included a digital camera function, so that they can capture still or moving images. The captured images can be used as a background image for the screen of the portable terminals and also can be transmitted to other portable terminals.

FIG. 1 illustrates a view of a conventional configuration of a phone number comprised of letters and numbers. As shown in FIG. 1, conventional phone numbers, such as a phone number for advertisement, may be configured by a combination of numbers and letters, so that people can easily memorize them. For example, if such conventional phone numbers are input in a portable terminal with a conventional 3×4 keypad shown in FIG. 2, corresponding keys are pressed on the 3×4 keypad, so that the portable terminal can send a call to the called party corresponding to the input phone number or store the phone number therein. Since letters contained in the conventional phone number previously are mapped to numbers, when they are pressed, the portable terminal recognizes numbers corresponding to the input letters.

More specifically, in order to send a call or store a phone number, such as for example, 1-800-4-BOOKIT, shown in FIG. 1, a user can successively press the alphanumeric keys, 1, 8, 0, 0, 4, 2, 6, 6, 5, 4, 8, on the conventional 3×4 keypad shown in FIG. 2.

Meanwhile, in a QWERTY keypad shown in FIG. 3, the alphanumeric keys are formed in such a way that numbers, '0' to '9', are mapped by part of the English alphabets, so that each alphanumeric key has one number and one letter. Therefore, if a conventional phone number comprised of a combination of numbers and letters is input to a portable terminal, through the conventional QWERTY keypad, a user must detect letters contained in the phone number, which do not form alphanumeric keys, refer to keys of the 3×4 keypad, corresponding to the detected letters, and then input keys in the QWERTY keypad, which correspond to the keys of the 3×4 keypad. This provides convenience for users when they use the portable terminal.

SUMMARY OF THE INVENTION

To address the above-discussed deficiencies of the prior art, it is a primary object to provide a portable terminal that receives a combination of numbers and letters input through its QWERTY keypad, and converts signals corresponding to input letters into signals corresponding to numbers, so that number signals are used to send a call or stored in a storage unit.

The present invention further provides a method for processing a phone number comprised of a combination of numbers and letters in a portable terminal with a QWERTY keypad.

In accordance with an exemplary embodiment of the present invention, the present invention provides a method for processing a phone number in a portable terminal with a QWERTY keypad, including: inputting a phone number; identifying whether the input phone number contains letters; and referring, if the input phone number contains letters, to a table for converting letters to numbers, and converting the identified letters into corresponding numbers.

In accordance with another exemplary embodiment of the present invention, the present invention provides a portable terminal with a QWERTY keypad, including: an input unit including the QWERTY keys; a display unit for displaying letters and/or numbers input via the input unit; a controller for referring, if a phone number input via the input unit contains letters, to a table for converting letters to numbers, and converting the letters contained in the phone number into corresponding numbers; and a storage unit for storing the conversion table.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communications terminal.

Although the drawings represent an embodiment of the invention, the drawings are not necessarily to scale and certain features may be exaggerated or omitted in order to better illustrate and explain the present invention. The same reference numbers are used throughout the drawings to refer to the same or similar parts.

In the following description, although the portable terminal with a QWERTY keypad, according to an embodiment of the present invention, is described based on a mobile communication terminal, it should be understood that present invention is not limited to the embodiment. It will be appreciated that the portable terminal can be applied to all information communication devices, multimedia devices, and their applications, such as, for example, a mobile phone, wired/wireless phone, a personal digital assistant (PDA), a smart phone, 3G terminals, and the like. Examples of the 3G terminals are a portable Internet terminal, an IMT-2000 terminal, a Global System for Mobile communication (GSM)/General Packet Radio Service (GPRS) terminal, a Universal Mobile Telecommunication Service (UMTS) terminal, and the like. The portable Internet terminal includes a Wideband Code Division Multiple Access (WCDMA) terminal and a Wibro terminal.

In the following description, the configuration of a portable terminal with a QWERTY keypad, according to a first embodiment of the present invention, is explained in detail with reference to FIG. 4.

Figure 1:
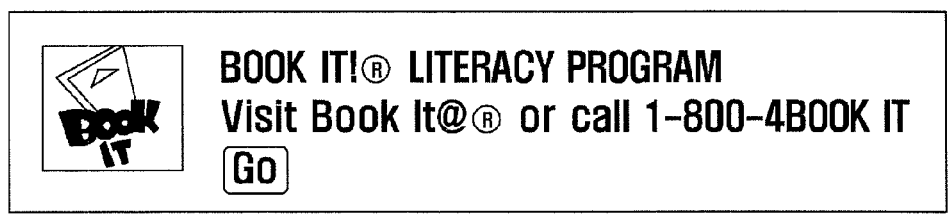
FIG. 1 illustrates a view of a conventional configuration of a phone number comprised of letters and numbers.
Figure 2:
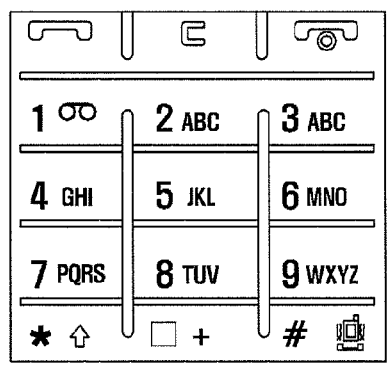
FIG. 2 illustrates a view of a 3×4 keypad.
Figure 3:
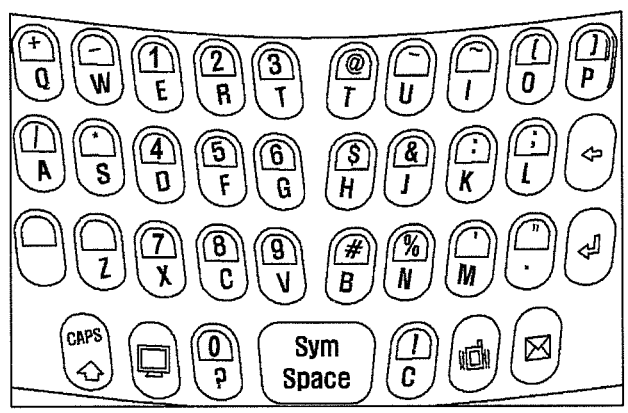
FIG. 3 illustrates a view of a QWERTY keypad.

Referring to FIG. 1, the portable terminal 100 includes a controller 110, an RF communication unit 120, an audio processing unit 130, an input unit 140, a storage unit 150, a video processing unit 160, and a display unit 170.

The RF communication unit 120 allows the portable terminal 100 to transmit or receive data via RF communication, to and from other portable terminals. The RF communication unit 120 includes an RF transmitter that can up-convert the frequency of transmitted signals and amplify the transmitted signals, and an RF receiver that can low-noise amplify received RF signals and down-convert the frequency of the received RF signals. The RF communication unit 120 receives data via an RF channel and outputs it to the controller 110. The RF communication unit 120 also receives data output from the controller 110 and transmits it via the RF channel.

The audio processing unit 130 can be configured to include a codec (coder and decoder). The codec includes a data codec that processes packet data and an audio codec that processes audio signals, such as voice signals. The audio codec converts digital audio signals, output from the controller 110, into analog signals, and then reproduces them via a speaker (not shown), when the portable terminal 100 makes a voice call. The audio codec also converts analog audio signals, input via a microphone (not shown), into digital signals and then outputs them to the controller 110.

The input unit 140 receives a user's operating signal that can control the portable terminal 100 and outputs it to the controller 110. The input unit 140 is configured to include a plurality of alphanumeric keys (not shown) that can receive numerical and letter information and control keys (not shown) that can control operations of the portable terminal 100. In an embodiment of the present invention, the input unit 140 is implemented in a QWERTY keypad.

The video processing unit 160 processes video signals, output from the controller 110, to form video data by frames, and then displays the video data on the screen of the display unit 170, meeting the display characteristics and size of the display unit 170. That is, the video processing unit 160 is configured to include a video codec that compresses video data in a preset method to meet the display characteristics of the display unit 170 or restores the compressed video data to the original video data. In an embodiment of the present invention, the video codec may be implemented with a JPEG codec, an MPEG codec, or a Wavelet codec.

The display unit 170 can display video data output from the video processing unit 160 on the screen thereof. The display unit 170 can be implemented with a liquid crystal display (LCD). In that example, the display unit 170 includes an LCD controlling unit, a memory for storing video data, and an LCD device. In particular, if the LCD is implemented with a touch screen, the display unit 170 also can serve as an input device.

The storage unit 180 can include a program memory and a data memory. The program memory stores programs configured to control an operation of the portable terminal 100. The data memory can store data generated while the programs are executed. The data memory also can store a variety of program images loaded on the display unit 170 by a signal processor. Examples of the program images are an image of a program for processing a video call, an image of a program for processing still images, and an image for a program for processing moving images. In an embodiment of the present invention, the storage unit 150 stores a table for converting letters into numbers as shown in the following Table 1. It should be understood that Table 1 does not limit the present invention. That is, it will be appreciated that the table for converting letters into numbers can be variously implemented according to the portable terminal manufacturers.

TABLE 1

| Letter | Number |
|---|---|
| Q, Z | 1 |
| A, B, C | 2 |
| D, E, F | 3 |

TABLE 1-continued

| Letter | Number |
| --- | --- |
| G, H, I | 4 |
| J, K, L | 5 |
| M, N, O | 6 |
| P, R, S | 7 |
| T, U, V | 8 |
| W, X, Y | 9 |

The controller 110 can control the operation of the portable terminal 100. In an embodiment of the present invention, when a message for sending a call is prepared and a recipient's phone number is input, the controller 110 converts letters contained in the input phone number into numbers, revering to a letter-to-number conversion table stored in the storage unit 150, for example, Table 1 as shown above.

In the following description, an embodiment of a method for sending a call in a portable terminal with a QWERTY keypad is explained in detail with reference to FIG. 5. The configuration of the portable terminal 100 described above will be more apparent from the following description regarding the method.

Figure 4:
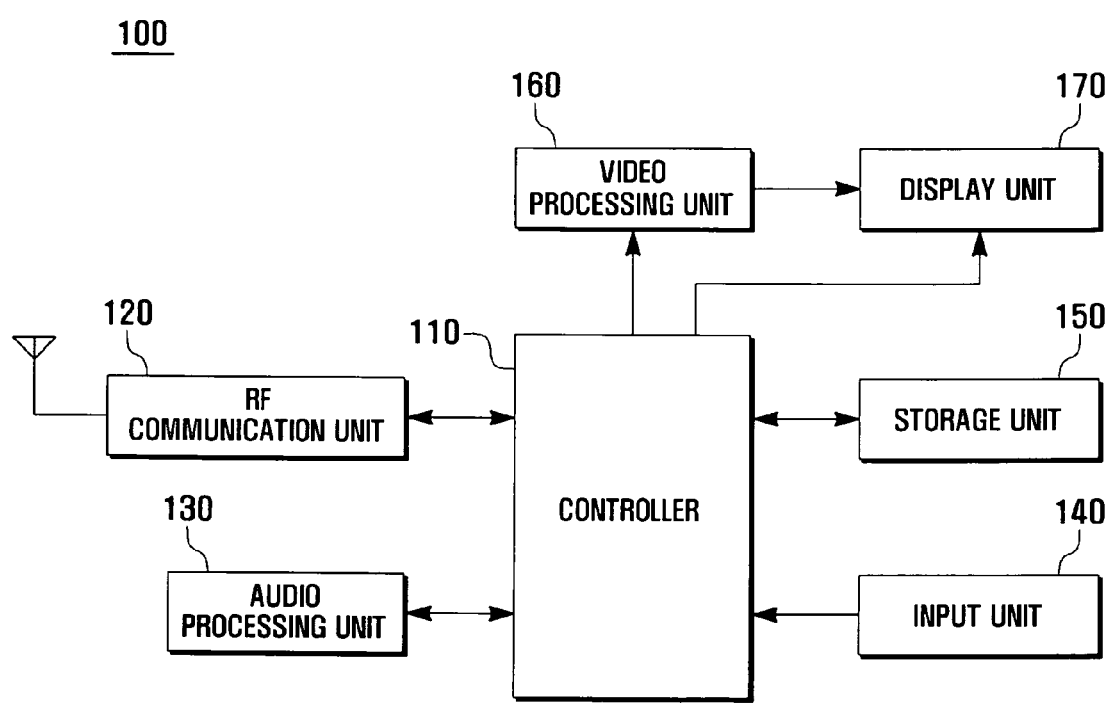
FIG. 4 illustrates a schematic block diagram of a portable terminal with a QWERTY keypad, according to an embodiment of the present invention.
Figure 5:
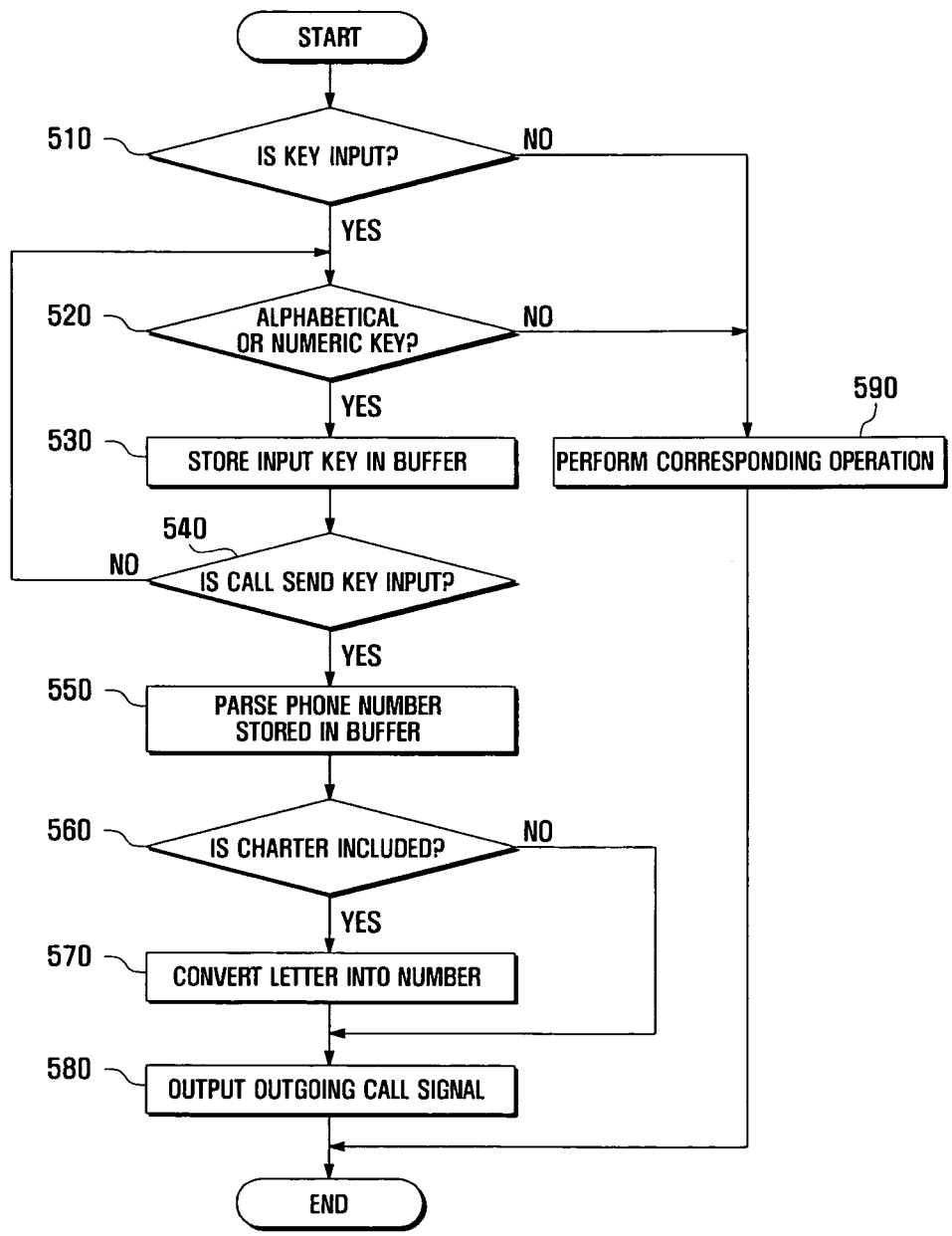
FIG. 5 illustrates a flow chart describing a method for sending a call in a portable terminal with a QWERTY keypad, according to an embodiment of the present invention.

Referring to FIGS. 4 and 5, the controller 110 checks whether a key is pressed on the input unit 140 of the portable terminal 100 (step 510). If the controller 110 ascertains that a key is not pressed on the input unit 140 at step 510, the controller 110 performs a corresponding operation (step 590), such as, for example retaining an idle state.

Alternatively, if the controller 110 detects a key input via the input unit 140 at step 510, the controller 110 determines whether the input key is a number key or an alphabetical key (step 520). If the controller 110 ascertains that the input key is not a numeric key or an alphabetical key but instead a function key, such as, for example, a key related to a camera function or a menu key, at step 520, the controller 110 performs a corresponding function of the function key (step 590).

Alternatively, if the controller 110 ascertains that the input key is a numeric key or a alphabetical key at step 520, the controller 110 stores information regarding the input key in the buffer and substantially simultaneously displays it on the display unit 170 (step 530). The portable terminal user can view the information regarding the input key displayed on the display unit 170.

After storing the information regarding the input key at step 530, the controller 110 determines whether a key for sending a call is pressed (step 540). If the controller 110 ascertains that keys other than a key for sending a call are input at 540, the controller 110 returns to and proceeds with step 520 and then repeats the steps described above. When the controller 110 ascertains that a numeric key or an alphabetical key is input at step 520, the controller 110 stores information regarding the input numeric or alphabetical key next to the stored information regarding the previously input key. Alternatively, if the controller 110 ascertains that a function key, for example, a cancel key, other than a numeric or alphabetical key, is input at step 520, the controller 110 stops inputting a phone number and then enters an idle state at step 590.

After storing information regarding the input key in the buffer at 530, the controller determines whether a key for sending a call is input to send a call or to send a message (step 540). If the controller 110 ascertains that a key for sending a call is input to send a call or to send a message at 540, the controller 110 parses a phone number comprises of a combination of numbers or letters (step 550). Thereafter, the controller 110 determines whether the input phone number contains numbers or letters (step 560).

If the controller 110 ascertains the input phone number contains letters at step 560, the controller 110 converts the letters into numbers, referring to the letter-to-number conversion table stored in the storage unit 150, for example, Table 1, and generates a converted phone number that contains only numbers (step 570). For example, if an input phone number is comprised of the letters Q and Z, the controller 110 converts the letters, Q and Z, into number, 1, referring to Table 1. Additionally, if an input phone number contains letters A, B, and C, the controller 110 converts the letters, A, B, and C, into number, 2.

Thereafter, the controller 110 outputs an outgoing call signal to send a call or to transmit a message to a called party corresponding to the converted phone number that contains only numbers, via the RF communication unit 120 (step 580).

Alternatively, if the controller 110 ascertains the input phone number does not contain letters at 560, the controller 110 outputs an outgoing call signal to send a call or to transmit a message to a called party corresponding to the phone number that contains only numbers, via the RF communication unit 120 at step 580.

In the following description, another embodiment of the method for sending a call in a portable terminal with a QWERTY keypad is described in detail with reference to FIG. 6. The configuration of the portable terminal 100 described above will be more apparent from the following description regarding the method.

Figure 6:
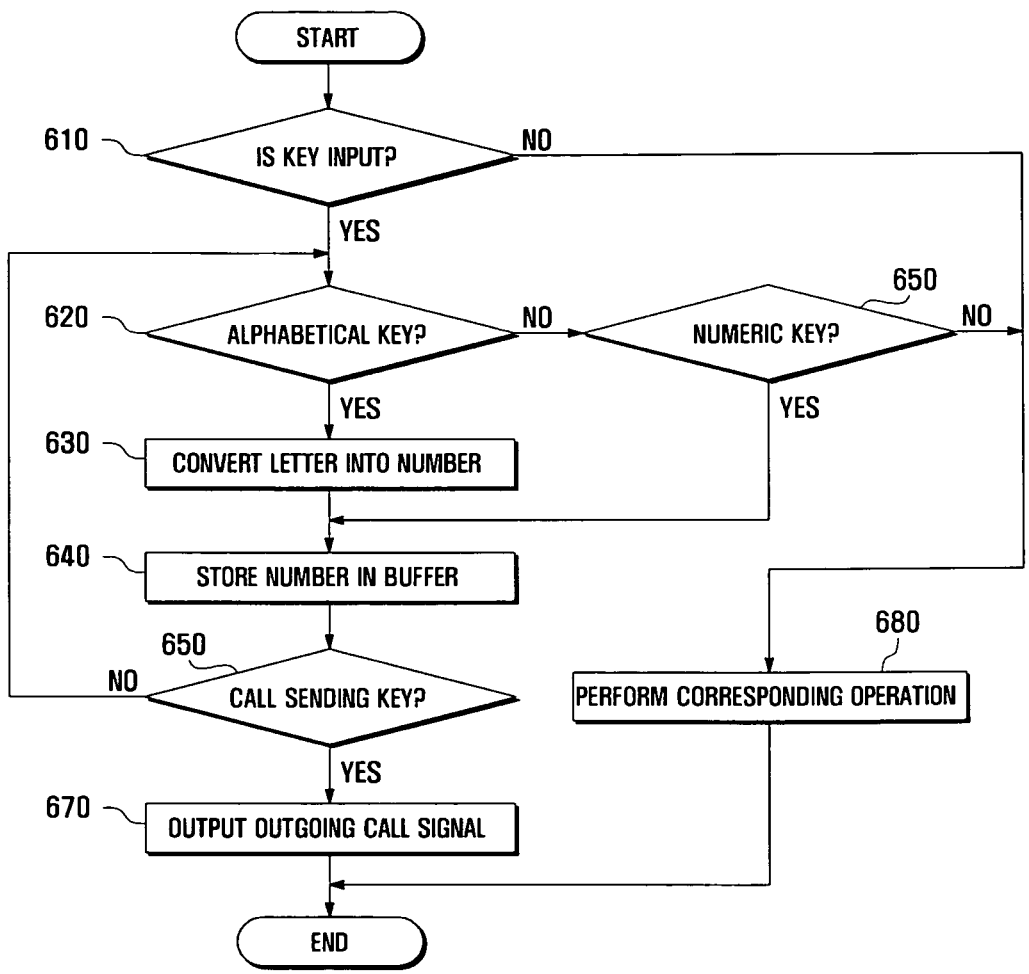
FIG. 6 illustrates a flow chart describing a method for sending a call in a portable terminal with a QWERTY keypad, according to another embodiment of the present invention.

Referring to FIGS. 4 and 6, the controller 110 checks whether a key is pressed on the input unit 140 of the portable terminal 100 (step 610). If the controller 110 ascertains that a key is not pressed on the input unit 140 at 610, the controller 110 performs a corresponding operation, such as retaining an idle state, (step 680).

On the contrary, if the controller 110 ascertains that a key is pressed on the input unit 140 at 610, the controller 110 determines whether an alphabetical key is pressed on the input unit 140 (step 620). If the controller 110 ascertains that an alphabetical key is pressed on the input unit 140 at 620, the controller 110 converts a letter corresponding to the input alphabetical key into corresponding number, referring to the letter-to-number conversion table stored in the storage unit 150, for example, Table 1 (step 630). For example, if the letters Q and Z are input via the input unit 140, the controller 110 converts the letters, Q and Z, into number, 1, referring to Table 1.

After that, the controller 110 stores the converted number in a buffer (step 640). The controller 110 stores a letter corresponding to the input key, and substantially simultaneously displays the letter on the display unit 170.

Meanwhile, if the controller 110 ascertains that an alphabetical key is not pressed on the input unit 140 at step 620, the controller 110 determines whether a numeric key is pressed on the input unit 140 (step 650). If the controller 110 ascertains that a numeric key is not pressed at step 650, the controller 110 concludes that the input key is other function keys, such as a camera operating key or a menu key, and performs a corresponding function at step 680.

Alternatively, if the controller 110 ascertains that a numeric key is pressed on the input unit 140 at step 650, the controller 110 stores a number corresponding to the input numeric key in the buffer at step 640. The controller 110 stores the number corresponding to the input numeric key and simultaneously displays the number on the display unit 170.

After data corresponding to the input key is stored in the buffer at step 640, the controller 110 checks whether a key for sending a call is input via the input unit 140 (660). If the controller 110 ascertains that an input key is not a key for sending a call at step 660, the controller 110 returns to step 620 and repeats the steps described above.

Alternatively, if the controller 110 ascertains that a key for sending a call has been input at step 660, the controller 110 outputs an outgoing call signal to send a call or to transmit a message to a called party corresponding to the phone number that is stored in the buffer at step 640 (step 670).

In the following description, a method for storing a phone number in a portable terminal with a QWERTY keypad is described in detail with reference to FIG. 7.

Figure 7:
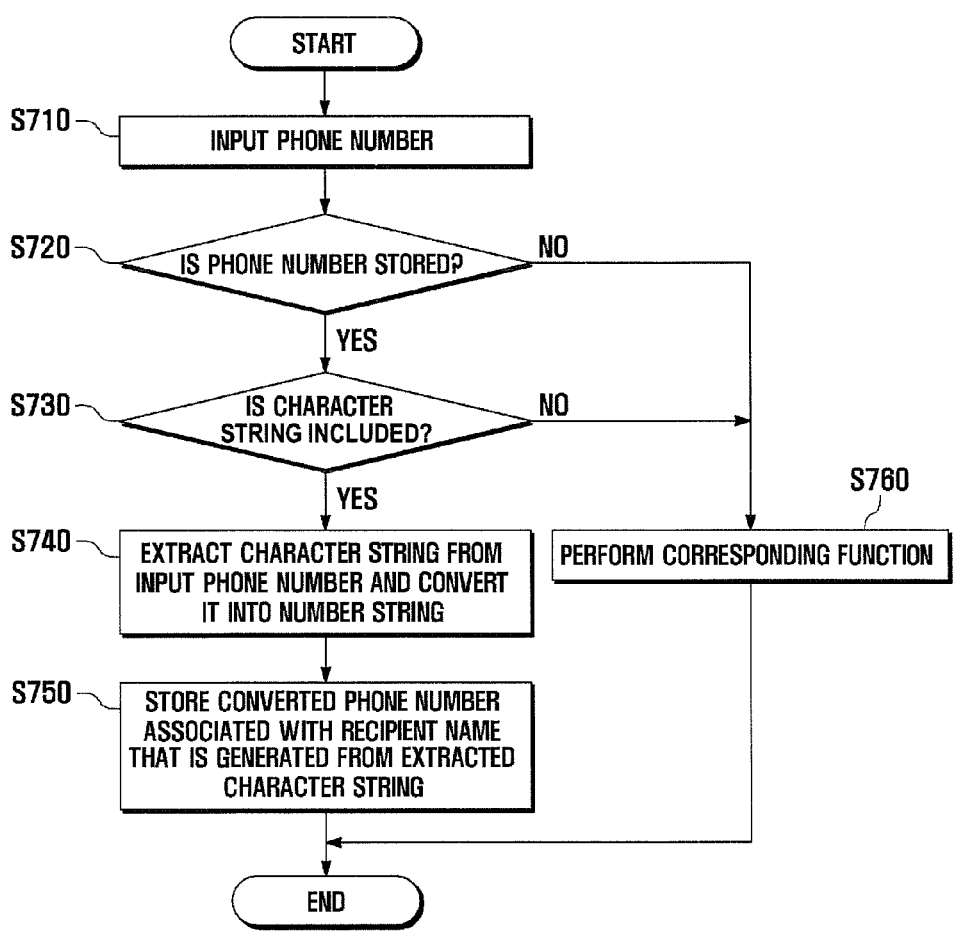
FIG. 7 illustrates a flow chart describing a method for storing a phone number in a portable terminal with a QWERTY keypad, according to an embodiment of the present invention.

Referring to FIGS. 4 and 7, the controller 110 controls the display unit 170 to display a phone number that a user inputs via the input unit 140 (step 710).

After that, the controller 110 checks whether a request for storing the input phone number is input (step 720). If the controller 110 ascertains that a request for storing the input phone number is not input but a request for sending a call is input at step 720, the controller 110 sends a call to a called party corresponding to the input phone number (step 760).

On the contrary, if the controller 110 ascertains that a request for storing the input phone number is input at step 720, the controller 110 determines whether the input phone number contains letters (step 730). If a phone number, for example, 1-800-4-BOOKIT, is input, the controller 110 parses the phone number and identifies that 'BOOKIT' is a character string. A character string includes at least one or more letters.

If the controller 110 ascertains that the input phone number does not contain letters at step 730, the controller 110 performs a corresponding function at step 760. For example, the controller 110 associates phone numbers with recipient's names, and then stores them in the storage unit 150.

Alternatively, if the controller 110 ascertains that the input phone number contains letters at step 730, the controller 110 extracts the letters from the phone number, converts the extracted letters into numbers, referring to a letter-to-number conversion table, for example, Table 1, and generates a converted phone number containing only numbers (step 740). If a phone number comprised of a combination of numbers and letters, for example, 1-800-4-BOOKIT, is input, the controller 110 parses the phone number and extracts a character string, 'BOOKIT'. Thereafter, the controller 110 converts the extracted character string 'BOOKIT' into a number string '266548', referring to a letter-to-number conversion table, for example, Table 1, and then generates a converted phone number containing only numbers, 1-800-4-266548.

Thereafter, the controller 110 designates the extracted character string to a recipient's name and then stores the converted phone number associated with the recipient's name in the storage unit 150 (step 750).

As described above, according to the present invention, when a phone number comprised of a combination of numbers and letters is input to a QWERTY keypad of a portable terminal, the input letters are converted to numbers to generate a new phone number containing the converted numbers, so that the portable terminal user does not need to check whether each of the letters included in the phone number is allocated to corresponding number and is able to send a call to the other party corresponding to the phone number or store the phone number in the portable terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for processing a phone number in a portable terminal with a QWERTY keypad, the method comprising:
   inputting a phone number;
   identifying whether the input phone number contains at least one letter;
   when the input phone number contains at least one letter, referring to a table for converting at least one letter to numbers, and converting the at least one identified letter into at least one corresponding number; and
   storing the at least one converted number in a storage unit of the portable terminal as a converted phone number, wherein storing the at least one converted number comprises when receiving a request to store the input phone number in the storage unit, identifying a character string including the at least one letter in the input phone number as a name for the converted phone number and storing the converted phone number with the name in the storage unit.

2. The method of claim 1, further comprising:
   displaying the converted phone number containing only numbers.

3. The method of claim 1, wherein storing the at least one converted number further comprises storing the converted phone number in a buffer in the storage unit.

4. The method of claim 1, further comprising:
   determining whether a key for sending a call is input; and
   when the key for sending the call is input, outputting an outgoing call signal to a called party corresponding to the converted phone number containing only numbers.

5. The method of claim 1, wherein storing the converted numbers comprises:
   determining whether a key for storing the phone number is input; and
   when the key for storing the phone number is input, storing the converted phone number containing only numbers.

6. The method of claim 5, wherein storing the converted phone number comprises:
   storing the at least one letter, contained in the input phone number, as a recipient name.

7. The method of claim 1, further comprising:
   displaying the input phone number comprised of the at least one letter and numbers.

8. A portable terminal with a QWERTY keypad, the portable terminal comprising:
   an input unit comprising a plurality of keys in a QWERTY format;
   a display unit configured to display at least one of a letter and a number input via the input unit;
   a controller configured to refer to a table when a phone number input via the input unit contains at least one letter, the table configured to convert at least one letter to at least one number, and wherein the controller is configured to convert the at least one letter contained in the phone number into a corresponding converted phone number, the converted phone number consisting of numbers; and
   a storage unit configured to store the table and store the converted phone number,
   wherein the controller is further configured to, when a request to store the input phone number in the storage unit of the portable terminal, identify a character string including the at least one letter in the input phone number as a name for the converted phone number and store the converted phone number with the name in the storage unit.

9. The portable terminal of claim 8, wherein the display unit is configured to display the converted phone number.

10. The portable terminal of claim 8, wherein the storage unit comprises a buffer configured to temporarily store the converted phone number.

11. The portable terminal of claim 8, wherein the controller is configured to output an outgoing call signal to a called party corresponding to the converted phone number when a key for sending a call is input via the input unit.

12. The portable terminal of claim 8, wherein the controller is configured to store the converted phone number in the storage unit when a key for storing the phone number is input via the input unit.

13. The portable terminal of claim 12, wherein the controller is configured to store the at least one letter, contained in the input phone number, as a recipient name.

14. The portable terminal of claim 8, wherein the display unit is configured to display the input phone number comprised of the at least one letter and numbers.

15. An apparatus for use in a portable terminal with a QWERTY keypad, the apparatus comprising:

an input unit comprising a plurality of keys in a QWERTY format;

a controller configured to refer to a table when a phone number input via the input unit contains at least one letter, the table configured to convert at least one letter to at least one number, and wherein the controller is configured to convert the at least one letter contained in the phone number into a corresponding converted numeric phone number; and a storage unit configured to store the table and store the corresponding converted numeric phone number, wherein the controller is further configured to, when a request to store the input phone number in the storage unit of the portable terminal, identify a character string including the at least one letter in the input phone number as a name for the corresponding converted numeric phone number and store the corresponding converted numeric phone number with the name in the storage unit.

16. The apparatus of claim 15, further comprising:

a display unit to display the converted phone number.

17. The apparatus of claim 15, wherein the controller is configured to output an outgoing call signal to a called party corresponding to the corresponding converted numeric phone number when a key for sending a call is input via the input unit.

18. The apparatus of claim 15, wherein the controller is configured to store the corresponding converted numeric phone number in the storage unit when a key for storing the phone number is input via the input unit.

19. The apparatus of claim 18, wherein the controller is configured to store the at least one letter, contained in the input phone number, as a recipient name.

20. The apparatus of claim 15, wherein the control unit is configured to cause the display unit to display the input phone number comprised of the at least one letter and numbers.

* * * * *